US008473378B2

(12) United States Patent
Seay et al.

(10) Patent No.: US 8,473,378 B2
(45) Date of Patent: Jun. 25, 2013

(54) GLOBAL TREASURY MONITORING SYSTEM

(75) Inventors: Daniel S. Seay, Charlotte, NC (US);
Robert C. Wider, Charlotte, NC (US);
Rajesh Khosla, Jacksonville, FL (US);
Jared J. Rorrer, Charlotte, NC (US);
Manoj Kapil, St. Augustine, FL (US);
Nathan L. Bernbaum, Dallas, TX (US);
Leslie D. Standlee, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 213 days.

(21) Appl. No.: 12/906,143

(22) Filed: Oct. 18, 2010

(65) Prior Publication Data
US 2012/0095885 A1 Apr. 19, 2012

(51) Int. Cl.
*G07F 19/00* (2006.01)
*G06Q 40/00* (2012.01)

(52) U.S. Cl.
USPC .............................................. 705/30; 705/39

(58) Field of Classification Search
USPC .......................................................... 705/30
See application file for complete search history.

(56) References Cited

U.S. PATENT DOCUMENTS

| 6,105,053 | A  | * | 8/2000 | Kimmel et al. | 718/105 |
|-----------|----|---|--------|---------------|---------|
| 7,379,907 | B2 | * | 5/2008 | Dang et al. | 705/31 |
| 7,873,573 | B2 | * | 1/2011 | Realini | 705/39 |
| 8,103,580 | B2 | * | 1/2012 | Sato et al. | 705/37 |
| 2009/0326998 | A1 | * | 12/2009 | Watkins et al. | 705/7 |

* cited by examiner

*Primary Examiner* — Garcia Ade
(74) *Attorney, Agent, or Firm* — Banner & Witcoff, Ltd.; Michael A. Springs (57) ABSTRACT

A global treasury monitoring system can provide a single centralized system of record for maintaining and updating global treasury limits to enable an organization to consistently allocate, apply and manage such limits across multiple types of platforms. Through a single system of record for the management of global treasury limits, an organization may comprehensively assess its risk exposure at any given time and make adjustments to limits on a real-time basis in response to rapidly-changing market conditions. The global treasury monitoring system can provide an organization with the ability to access, evaluate and reconfigure recorded treasury limits in real-time through various graphical user-interfaces (GUIs) accessible to users at various global locations. As treasury limits are utilized the system may update the availability of such limits so that an organization's risk exposure may be constantly monitored and assessed. The system also provides an organization with additional flexibility in programming a client's treasury limits to match the client's various liquidity needs around the globe while also managing the amount of the risk that the organization is willing to take on to attain appropriate returns.

21 Claims, 10 Drawing Sheets

RELATIONSHIP & ACCOUNT SUMMARY VIEW

| GCI Number | Client Name | BOD Book Facility Amount | DOL Book Facility Amount | IWPAL Book Facility Amount | BOD Multi Book Facility Amount | TM Cust Limit Amount |
|---|---|---|---|---|---|---|
| 11111111 | Company XYZ | ###### | | | | |
| 4444444 | XYZ East | | ###### | | | |
| 5555555 | XYZ East 1 | | | | | |
| 00000022 | XYZ East 1A | | | | | |
| 00000033 | XYZ East 1B | | | | | |
| 66666666 | XYZ East 2 | | | | | |
| 77777777 | XYZ East 3 | | | | | |
| 88888888 | XYZ East 4 | | | | | |
| 99999999 | XYZ East 5 | | | | | |

FACILITY BOOKING DETAILS

Basic Information

| | | | |
|---|---|---|---|
| Facility ID/Limit ID | | Facility Type | DOI |
| FRR | | GCI # | 1111111111 | Client Name | Company XYZ |
| | | * Guidance Amount | 0.00 | * Advised Amount | 0.00 |
| | | Guidance Amount or Advised Amount is mandatory | | ○ Advised Amount | |
| * Currency Type | | * Allocation By | ○ Guidance Amount | | |
| Annual Review Date | | * Expiry Date | | * Maturity Date | |
| BRCH Cost Cen | | Company Code | #XX#X | Cost Center | |
| Class Code | | Unit Oblig Obign | | Credit Unit | Center 123 |
| Binding | | Authorized Borrowers at Initial Setup | | | |
| Region | | Revolving | ☑ | Product Code | |
| ☑ Show Primary Collateral Codes | | Branch | | Booking Unit | |
| Collateral Codes | | Purpose Code | | Syndicated | Other financing |
| Term Commitment | | Loan Facility | ☐ | Total R-Credit Out Amount | |
| * BCR # | | * Country Of Risk | | Limit Change Effective Date | N - Not Syndicated |

Specific Information

| | | | | |
|---|---|---|---|---|
| Tenor Flag | ☐ | Tenor Days | 0 | Tenor Amount | 0.00 | Tolerance Facilitating Extension Date | 08/11/2010 |
| Blocked/Temp. Incr Flag | ☐ | | | Blocked/Temp. Incr. Amount | 0.00 | Blocked/Temp. Incr. Expiration Date | |

Facility Approval Details

| | | |
|---|---|---|
| Last Name | | First Name |
| Last Name should be at least 2 characters to enable Lookup | | |
| | [Lookup] | |
| | [Add] | Approval Date |
| Approver Name | [Delete] | |
| Credit/Risk Approver Name(s) | [Clear] | Approval Document Type |

Additional Information

[OK] [Cancel]

GLOBAL TREASURY MONITORING SYSTEM

FIELD

Aspects of the disclosure relate to managing risk. More specifically, aspects of the disclosure relate to managing global risk exposure by establishing shared treasury limits across a client relationship and allowing for real-time access and adjustment to such limits on a global scale.

BACKGROUND

In today's global business environment, financial institutions often have corporate and commercial clients that operate in numerous regions throughout the world. For example, a parent company headquartered in the United States may have subsidiary companies located in China, Germany, Australia, and a host of other countries across the globe. Financial institutions offering treasury services to such multinational clients typically manage their risk exposure by establishing transaction, daylight, and overnight limits that are used for monitoring and decisioning payment releases. To support the management and application of these treasury limits, it is not uncommon for a single financial institution to maintain separate and distinct regional and/or country-specific platforms and processes. However, managing a shared global treasury limit and subsequent payments decisioning for multinational clients requires extensive coordination between regional divisions of a financial institution and a significant investment of time and effort. Furthermore, the manual nature of applying treasury limits when decisioning payments across multiple platforms offers very little flexibility to accommodate clients' global needs.

Many financial institutions utilize inconsistent processes and systems for establishing and managing treasury limits across multiple platforms and lines of business. Lack of access to centralized data contributes to this inconsistency, which ultimately increases operating expenses and exposes the institution to higher levels of risk.

BRIEF SUMMARY

The following presents a simplified summary of the disclosure in order to provide a basic understanding of some aspects herein that allow for managing global treasury risk exposure from a centralized treasury monitoring system. It is not intended to identify key or critical elements of the disclosure or to delineate the scope of the disclosure. The following summary merely presents some concepts of the disclosure in a simplified form as a prelude to the more detailed description provided below.

One or more aspects described herein relate to a global treasury monitoring system that provides a single centralized system of record for global treasury limits that allows for consistent allocation, application and management of global treasury limits across multiple platforms. Global treasury limits may be centrally recorded and utilization of limits monitored to allow an organization to systematically decision release of payment exceptions to the limits based on a client's global position and regardless of the platform involved. Through a single system of record for the management of global treasury limits, an organization may comprehensively assess its risk exposure at any given time and make adjustments to limits on a real-time basis in response to rapidly-changing market conditions.

One or more other aspects described herein relates to a single centralized system of record for maintaining and managing treasury limits of an organization with the ability to access, evaluate and reconfigure such limits in real-time. In at least one arrangement, the system enables an organization to manage treasury limits across all platforms of the organization through a graphical user-interface (GUI) accessible to various members of the organization at different locations around the world. The ability to manage global treasury limits through such a user-interface may extend to both auto-decisioning and manual processes involving the limits. For example, when changes are made to recorded treasury limits of a particular client (e.g., customer, member, account-holder, client, and the like), such changes are reflected in the system in real-time and made available to all downstream processes utilizing those limits. Additionally, as treasury limits are utilized the system may update the availability of such limits so that an organization's risk exposure may be constantly monitored and assessed to determine if corrective action is needed.

According to other aspects described herein, the global treasury monitoring system provides real-time deposit balance aggregation such that an organization may efficiently prioritize exception payments.

Aspects of the disclosure may be provided in a computer-readable medium having computer-executable instructions to perform one or more of the process steps described herein.

These and other aspects of the disclosure are discussed in greater detail throughout this disclosure, including the accompanying drawings.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of various illustrative embodiments, reference is made to the accompanying drawings, which form a part hereof, and in which is shown by way of illustration various embodiments in which one or more aspects of the disclosure may be practiced. It is to be understood that other embodiments may be utilized and structural and functional modifications may be made without departing from the scope of the present disclosure.

By way of general introduction, aspects of the disclosure relate to providing an organization with a method and system for recording and managing global treasury limits from a centralized monitoring platform. Maintaining, updating and adjusting global treasury limit utilization in a single centralized system of record allows an organization (e.g., a financial institution) offering treasury services to its clients to minimize the organization's risk exposure and consistently allocate, apply, and manage treasury limits regardless of the platform involved. Furthermore, a global treasury monitoring system, such as will be described in further detail herein, allows for significantly increased efficiency in processing transactions exceeding a line of credit based on risk policy and treasury limits. The system as described herein provides an organization with additional flexibility in programming a client's treasury limits to match the client's various liquidity needs around the globe while also managing the amount of the risk that the organization is willing to take on to attain appropriate returns (e.g., the organization's "risk appetite"). By monitoring and adjusting the way in which treasury limits are allocated within a family structure for a client, the organization is able to reduce the total limits that a client utilizes.

One or more aspects described herein relate to a global treasury monitoring system (GTMS) that enables an organization and its clients to gain centralized access to global treasury account details and perform numerous types of treasury-related transactions. For example, in at least one arrangement, GTMS allows an organization and, under certain conditions or with certain restrictions, authorized clients (e.g., customers, members, account-holders, and the like) of the organization to view, analyze, adjust and report treasury limit data and information so to improve workflow processes and efficiently manage liquidity and risk exposure.

As will be described in greater detail below, GTMS provides a single centralized system of record for maintaining and managing treasury limits and enables users to access, evaluate and reconfigure such limits in real-time. In at least one arrangement, the system provides an organization with the ability to manage treasury limits across all platforms of the organization through a graphical user-interface (GUI) accessible by various users at different locations around the world. Additionally, the ability to manage global treasury limits through such a user-interface may extend to various auto-decisioning and manual processes involving the limits, such as when the organization receives transaction requests for withdrawals exceeding a line of credit. In one example, when changes are made to recorded treasury limits of a particular client, such changes are reflected in the system in real-time and made available to all downstream processes utilizing those limits. Additionally, as treasury limits are utilized the system may update the availability of such limits so that an organization's risk exposure may be constantly monitored, assessed and reported out as necessary.

An organization offering treasury services to clients typically manages the organization's risk exposure by establishing transaction, daylight and overnight limits (e.g., limits, treasury limits, utilization limits, facilities, and the like) used for monitoring and decisioning payment releases on relevant accounts. As will be described in greater detail herein, one or more aspects of GTMS relates to the ability to systematically identify accounts that have access to a limit as well as accounts that are in a relationship with a limit (e.g., accounts related to one or more other accounts that have access to a limit).

Other aspects described herein relate to GTMS having the ability to aggregate client relationship balances and selectively present such aggregated data for automated and manual decisioning of transactions exceeding a line of credit. In one or more arrangements, the system may aggregate such balances within configurable parameters, including, for example, line of business (LOB) associated with the client relationship, specific clients and/or accounts, types of deposits involved), and the like. Additionally, certain types of accounts may have specific inclusion/exclusion criteria associated with them that may be assessed prior to such balance aggregation.

Aspects described herein relate to a system that provides an organization with the ability to book and share treasury limits within a client's family of accounts on a global scale. For example, an organization may comprise many separate branches, regional offices, subsidiaries and the like, some or all of which utilize different platform systems for recording and maintaining treasury limits (e.g., for the organization's client accounts). As will be described herein, GTMS provides the aggregation that an organization needs to understand and book limits and process exceptions against those limits, and also identify different ways to helping clients lessen their utilization of treasury limits around the globe to increase their liquidity. Once the organization has established a treasury limit for a client, that limit may be passed around to other locations throughout the world and shared in a manner that will enhance both the organization and the client's ability to assess risk and evaluate liquidity levels. Instead of an organization looking to multiple different treasury limits utilized by a client at different locations throughout the world, GTMS provides the organization with a system of establishing one shared limit.

Additionally, various items of information related to treasury limits may be input into GTMS on a real-time basis from the numerous platforms of the organization. The transaction types input into GTMS may be configurable such that new transactions types may be added, or existing transaction types deleted, as input into GTMS at any point in time. GTMS may be configured to accept or exclude certain transaction types as input based on particular criteria. For example, GTMS may be configured to exclude transactions based on specific types of accounts, product types, lines of business (LOB), clients, and the like.

Figure 1:
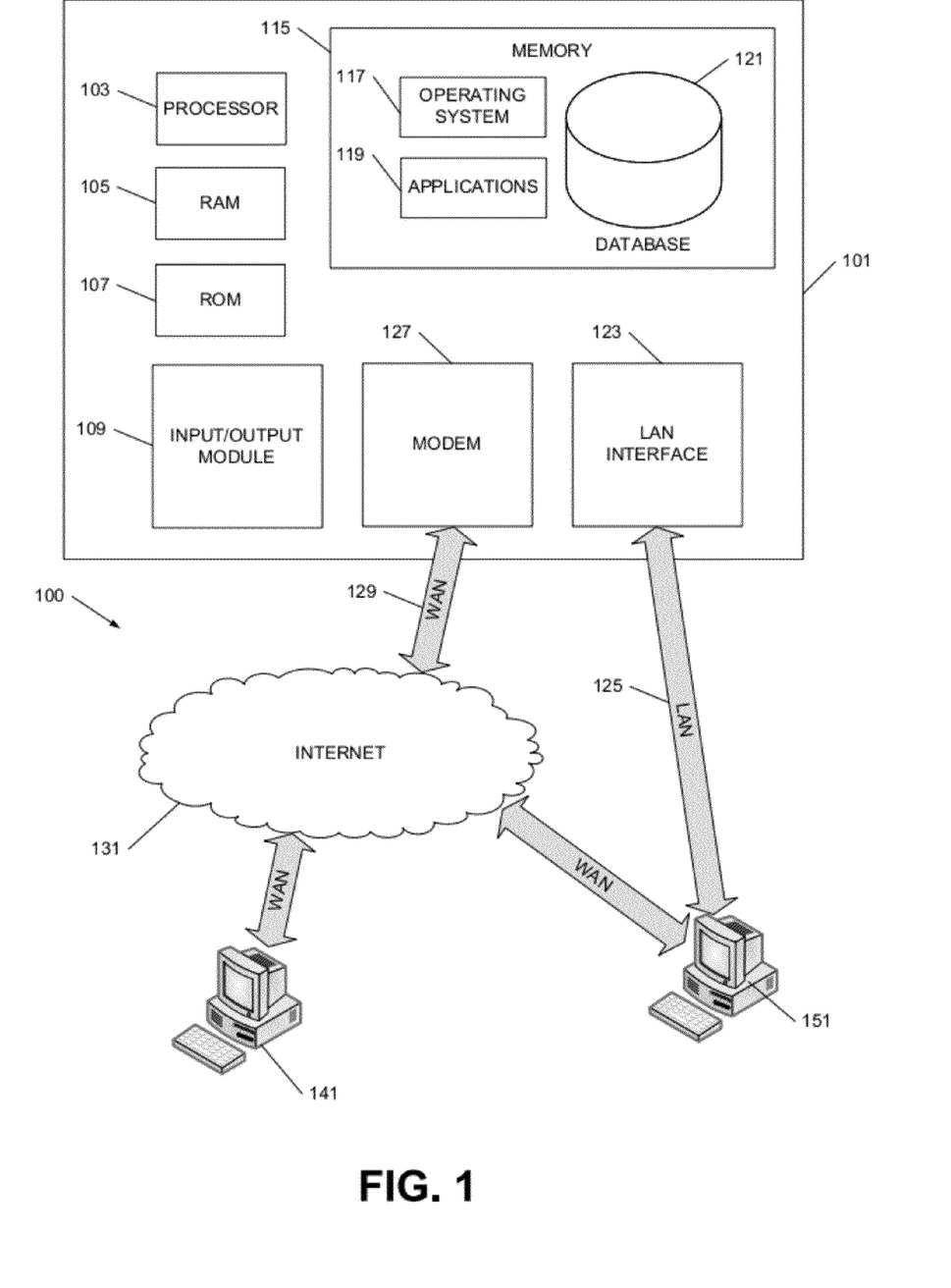
FIG. 1 illustrates a schematic diagram of a general-purpose digital computing environment in which certain aspects of the present disclosure may be implemented.

FIG. 1 illustrates a block diagram of a generic computing device 101 (e.g., a computer server) that may be used according to an illustrative embodiment of the disclosure. The computer server 101 may have a processor 103 for controlling overall operation of the server and its associated components, including RAM 105, ROM 107, input/output module 109, and memory 115.

Input/Output (I/O) 109 may include a microphone, keypad, touch screen, camera, and/or stylus through which a user of device 101 may provide input, and may also include one or more of a speaker for providing audio output and a video display device for providing textual, audiovisual and/or graphical output. Other I/O devices through which a user and/or other device may provide input to device 101 also may be included. Software may be stored within memory 115 and/or storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown). As described in detail below, the database 121 may provide centralized storage of characteristics associated with individuals, allowing interoperability between different elements of the organization residing at different physical locations.

Server 101 may operate in a networked environment 100 supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. Furthermore, any of a number of different communication protocols, such as TCP/IP, Ethernet, FTP, HTTP and the like, may be used within networked environment 100.

Additionally, an application program 119 used by the server 101 according to an illustrative embodiment of the disclosure may include computer executable instructions for invoking functionality related to providing access authorization for facilities and networks.

Computing device 101 and/or terminals 141 or 151 may also be mobile terminals including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by a computer. Generally, program modules include routines, programs, objects, components, data structures, and the like, that perform particular tasks or implement particular abstract data types. The disclosure may also be practiced in distributed computing environments where tasks are performed by remote processing devices that are linked through a communications network. In a distributed computing environment, program modules may be located in both local and remote computer storage media including memory storage devices.

Figure 2:
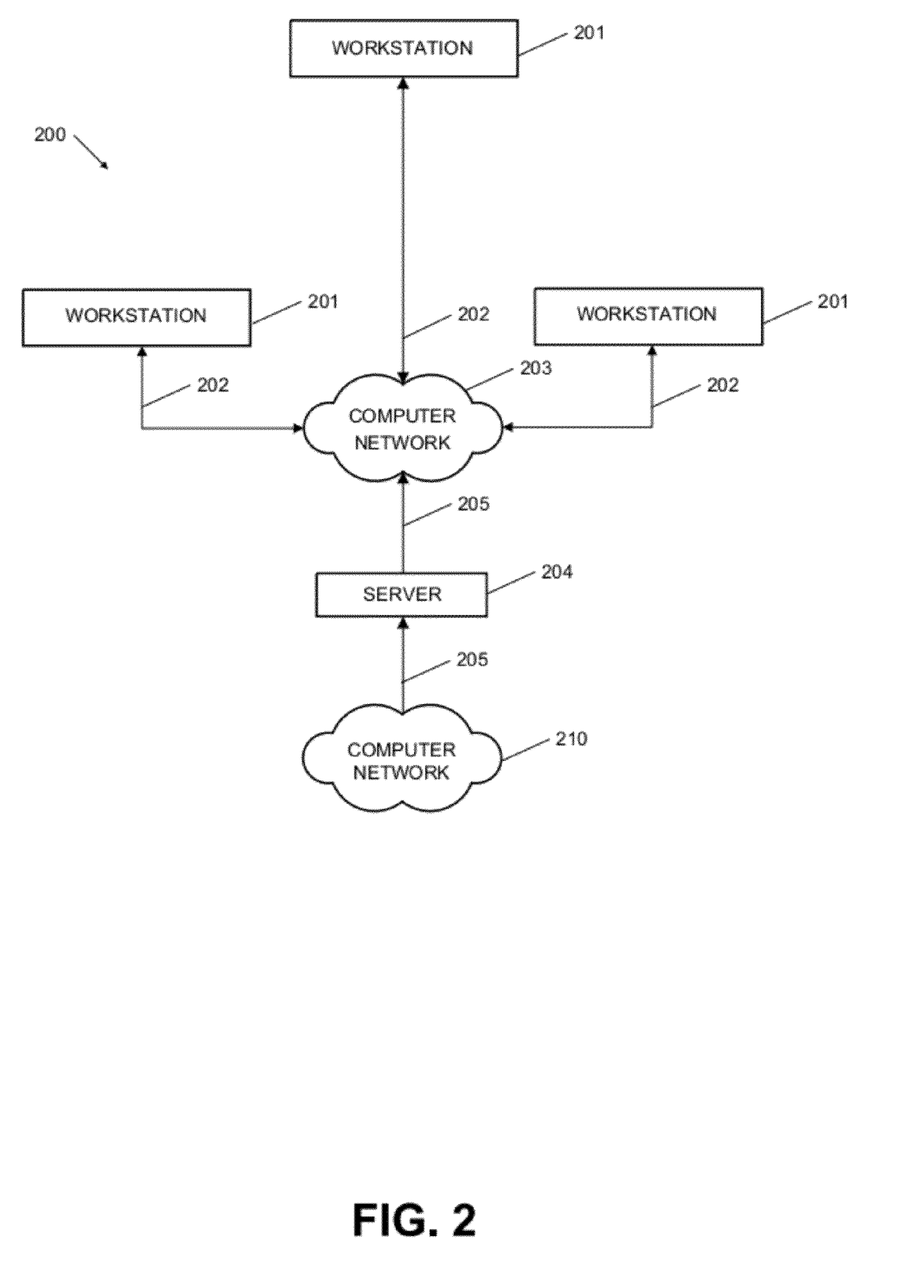
FIG. 2 is an illustrative block diagram of workstations and servers that may be used to implement the processes and functions of certain embodiments of the present disclosure.

Referring to FIG. 2, an illustrative system 200 for implementing methods according to the present disclosure is shown. As illustrated, system 200 may include one or more workstations 201. Workstations 201 may be local or remote, and are connected by one or more communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, and the like.

The steps that follow in the Figures may be implemented by one or more of the components in FIGS. 1 and 2 and/or other components, including other computing devices.

Figure 3:
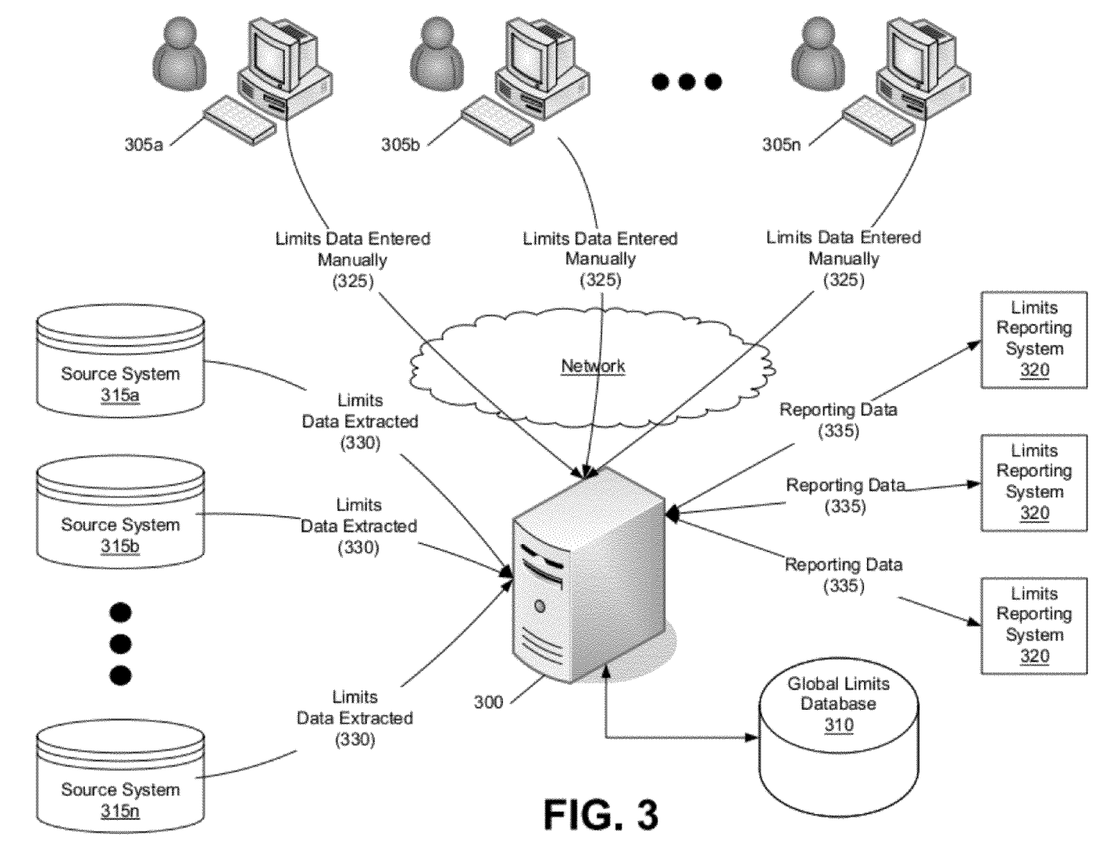
FIG. 3 illustrates an example data flow diagram for recording and storing treasury limits within a centralized system of record according to one or more aspects described herein.

FIG. 3 illustrates an example data flow for recording and storing treasury limits within a centralized system of record in accordance with various aspects of the disclosure. As shown in FIG. 3, a global treasury monitoring system (GTMS) 300, which may be any of numerous different types of processing devices, such as a computer, server, and the like, receives data related to treasury limits from a plurality of source systems 315a through 315n (where "n" is an arbitrary number) as well as from a plurality of users 305a through 305n (where "n" is again an arbitrary number). In at least some arrangements, source systems 315a through 315n have limits data is extracted 330 from them by GTMS 300 such that GTMS 300 may utilize updated information stored in source systems 315a through 315n at periodic intervals (e.g., every minute, every ten minutes, every hour, and the like) determined, for example, by the organization operating GTMS 300. Additionally, users 305a through 305n may provide GTMS 300 with limits data entered manually 325, either through any of the various GUIs described in greater detail below and illustrated in FIGS. 6-10.

Also illustrated in FIG. 3 are limits reporting systems 320, which communicate with GTMS 300 by sending and receiving reporting data 335. In some arrangements, reporting data 335 may be limits data (e.g., limits data extracted 330 and limits data entered manually 325) that is condensed, analyzed or otherwise processed in various ways by GTMS 300. Additionally, as shown, GTMS 300 may maintain various limits data in Global Limits Database 310.

Figure 4:
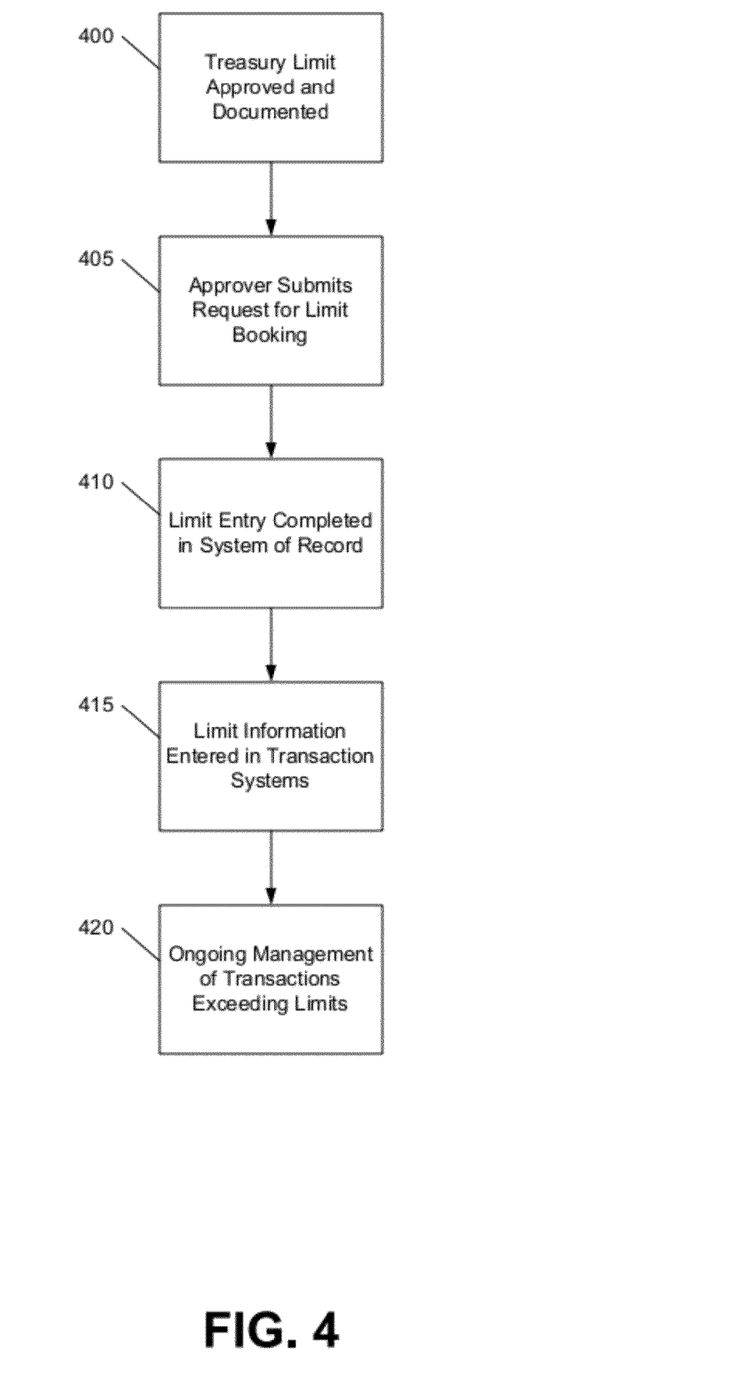
FIG. 4 is a flowchart illustrating an example high-level process of booking and monitoring treasury limits within a centralized system of record according to one or more aspects described herein.

FIG. 4 is a flowchart illustrating a high-level process of approving, booking and managing a global treasury limit according to one or more aspects described herein. As shown in FIG. 4, in step 400 a treasury limit is approved and documented. In one example the limit may be developed, analyzed and approved by a member of an organization using and managing a global treasury monitoring system (e.g., global treasury monitoring system 300 shown in FIG. 3) and may be based on a variety of factors related to a client relationship, previous or existing risk ratings and numerous other considerations that may vary depending on the particular goals and concerns of the organization. Once a limit is approved and document in step 400, the process then continues to step 405 where an approver of the organization submits a request for the limit to be booked into a centralized system of record which, in some arrangements, maybe included within a global treasury monitoring system as described herein. For example, an organization may configure and maintain the global treasury monitoring system as a centralized system of record for storing shared treasury limits across various client relationships.

In step 410 a limit entry is completed in the centralized system of record and in step 415 the limit entry is entered into one or more transaction systems for use by the organization in processing, for example, transactions exceeding a line of credit pending for certain client accounts. The process then proceeds to step 420 in which the system continues ongoing management of transactions exceeding the stored or booked treasury limits (e.g., transactions exceeding a line of credit). In one or more arrangements, the ongoing management of transactions exceeding the limits includes decisioning (e.g., approving, rejecting, and the like) such transactions, updating authorized borrowers of stored limits based on how transactions are decisioned, allocating stored limits in one or more ways across the authorized borrowers as well as numerous other related processes and operations.

Figure 5:
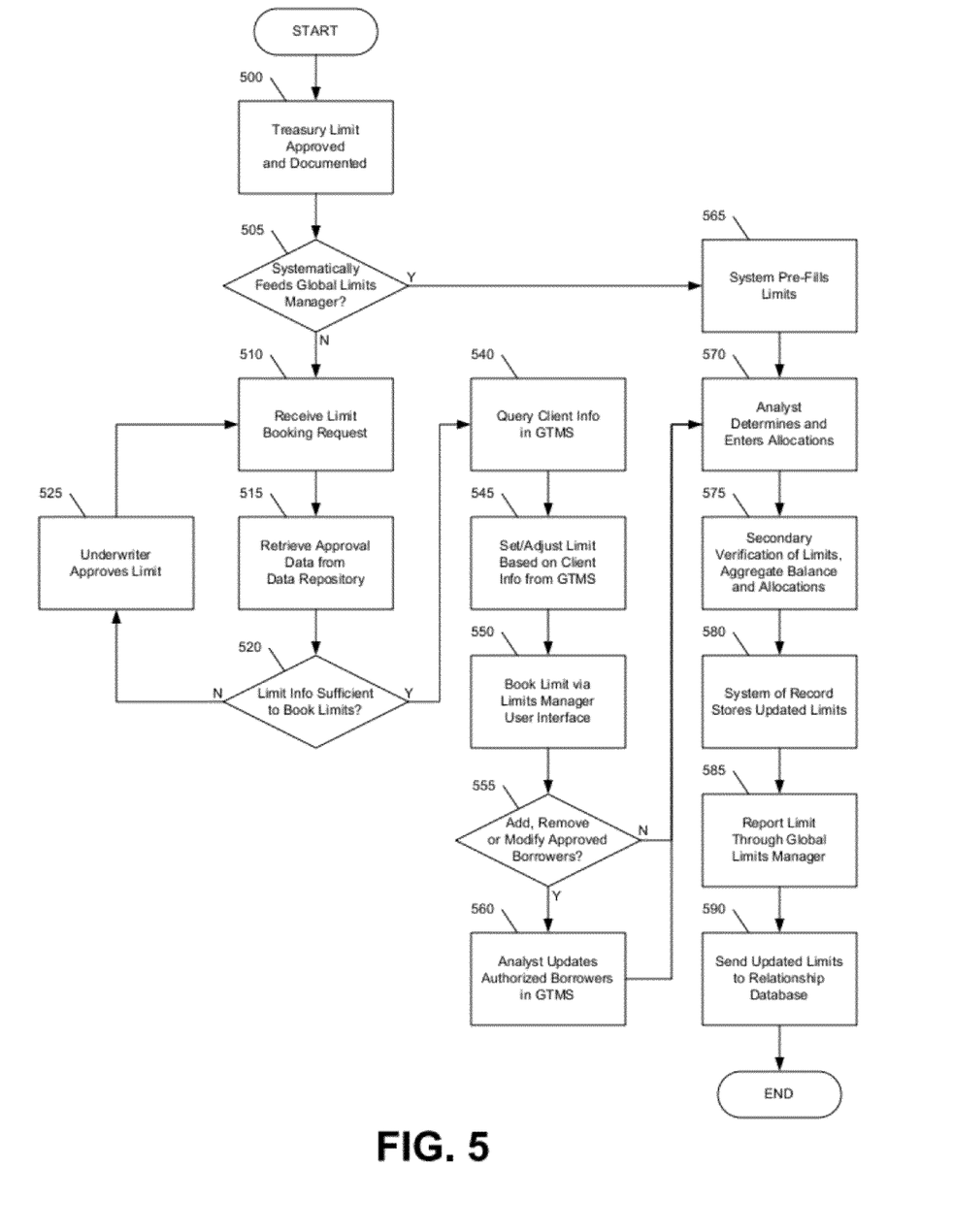
FIG. 5 is a flowchart illustrating an example method of approving and booking treasury limits within a centralized system of record according to one or more aspects described herein.

FIG. 5 is a flowchart illustrating an example method of approving and booking treasury limits within a centralized system of record according to various aspects of the disclosure. The process beings at step 500 where a treasury limit is approved and documented. As described above, a treasury limit may be developed, analyzed, processed and approved and documented by a member of an organization using and managing a global treasury monitoring system (e.g., global treasury monitoring system 300 shown in FIG. 3). Additionally, approving a documenting a treasury limit may in some arrangements be based on a variety of factors associated with a client relationship, account, account history, and the like. Once the limit is approved and documented, the process continues to step 505 where it is determined whether the limit may be systematically fed to a global limits manager (GLM). In some arrangements, a global limits manager as used herein refers to a computer, server, database or other similar processing device configured to store, manage, analyze and report treasury limits for the organization. In other arrangements, a global limits manager may additionally or alternatively refer to software executing on a computer or other similar processing device. If it is found in step 505 that the limit may be fed to a GLM then the process proceeds to step 565 where the system pre-fills limits into the centralized system of record in an automated fashion without the need for additional processing or data.

If at step 505, it is instead determined that the limit cannot be systematically fed into a GLM, then the process goes to step 510 where a limit booking request is received. A request to book a limit may be received from, for example, an approver of the organization who was involved in the limit approving and documenting steps described above. In step 515, the system retrieves approval data from a data repository, which in one or more arrangements may be an approval database maintained by the organization and accessible to the global treasury monitoring system through various communication channels. In step 520 it is determined whether there is sufficient info about the limit for the limit to be booked. If not, then in step 525 an underwriter or other similarly authorized individual may book the limit. However, if sufficient limit data is found for the limit to be booked in step 520, then the process continues to step 540 where client information related to the limit is queried in the global treasury monitoring system.

In step 540 the client information that may be queried or otherwise requested and obtained may include various details related to one or more clients associated with an account to which the limit involved in the process is to be applied. As described herein, different client relationships may exist across an organization such that one or more parent clients may be included on accounts identified or associated with subsidiary or primary clients. The interrelationships between clients that belong to a single client relationship or family of client accounts may vary depending on various formalities and organizational aspects relevant to the particular companies involved. Accordingly, the client information queried in step 540 may include different types and amounts of data depending on the certain characteristics of the clients to which the limit that is to be booked applies and affects. In step 545 the system set/adjusts the limit based on the client information queried for in step 540 and then in step 550 the limit is booked via a limits manager user interface. Although specific features of the limits manager user interface are described in greater detail below, in one or more arrangements the user interface may include both viewing/displaying capabilities as well as certain performance functions that may be configured to allow a user to process or add to the limit in various ways. For example, a user may book the limit via the user interface in step 550 along with submitting additional data specifying or clarifying one or more aspects related to the limit or the underlying account or client that is to be used when the limit is managed in the future.

Once the limit is booked in step 550, the process goes to step 555 where it is determined whether any authorized borrowers of the limit are to be added, removed or modified. As used herein, an authorized borrower is a related or under certain circumstances involving submitted approval, an unrelated client that is permitted to utilize the booked limit when transactions exceeding a line of credit are being decisioned. For example, a parent client may have several authorized borrowers for a booked limit in order to allow subsidiary clients to share the limit when the system processes transactions exceeding a line of credit. Authorized borrowers are updated in the system in step 560 and then in step 570 allocations are determined and entered for the limit and authorized borrowers. In step 570, an analyst may determine how a shared limit is to be allocated between authorized borrowers based on certain factors including, for example, aggregated account balances, holds placed on accounts, certain indicia that require accounts be excluded from sharing a limit across a relationship, and other similar types of related criteria. The remaining steps illustrated in FIG. 5 include secondary verification of the limit and allocations in step 575, the system of record storing updated limits in step 580 and limits data being reported (step 585) and sent out to other databases (590) such as relationship database.

FIGS. 6-10 are example graphical user interfaces (GUIs) illustrating various capabilities and functions of a GTMS (e.g., GTMS 300 shown in FIG. 3), such as those described above. The example GUIs shown in FIGS. 6-10 may be configured to provide users with the ability to review, adjust, update and report various limits data and information associated with certain client relationships within the organization maintaining GTMS. As will be described in greater detail below, the example GUIs illustrated in FIGS. 6-10 enable users to review recorded limits-related data for clients and, if necessary, adjust such data in real-time as clients utilization of their respective limits changes.

GTMS may generate the GUIs shown in FIGS. 6-10 to ensure consistent and efficient access to and adjustment of recorded treasury limits across all platforms of the organization. Additionally, GTMS may provide consolidated client views and reports of all relevant data and information within the GUIs such that authorized sharing of limits may be changed as needed to reflect corresponding changes in client relationships and/or the marketplace. As will be described in greater detail below, the GUIs illustrated in FIGS. 6-10 may be configured by GTMS to allow users to sort the data presented, submit additional data, edit existing data, generate reports based on certain displayed data, setup and/or send notifications, as well as perform additional functions that may be determined by the organization operating and maintaining GTMS. The example user interfaces illustrated in FIGS. 6-10, and described in further detail below, are presented only for illustrative purposes and are in no way intended to limit any of the features of the various arrangements and embodiments of the present disclosure.

Figure 6:
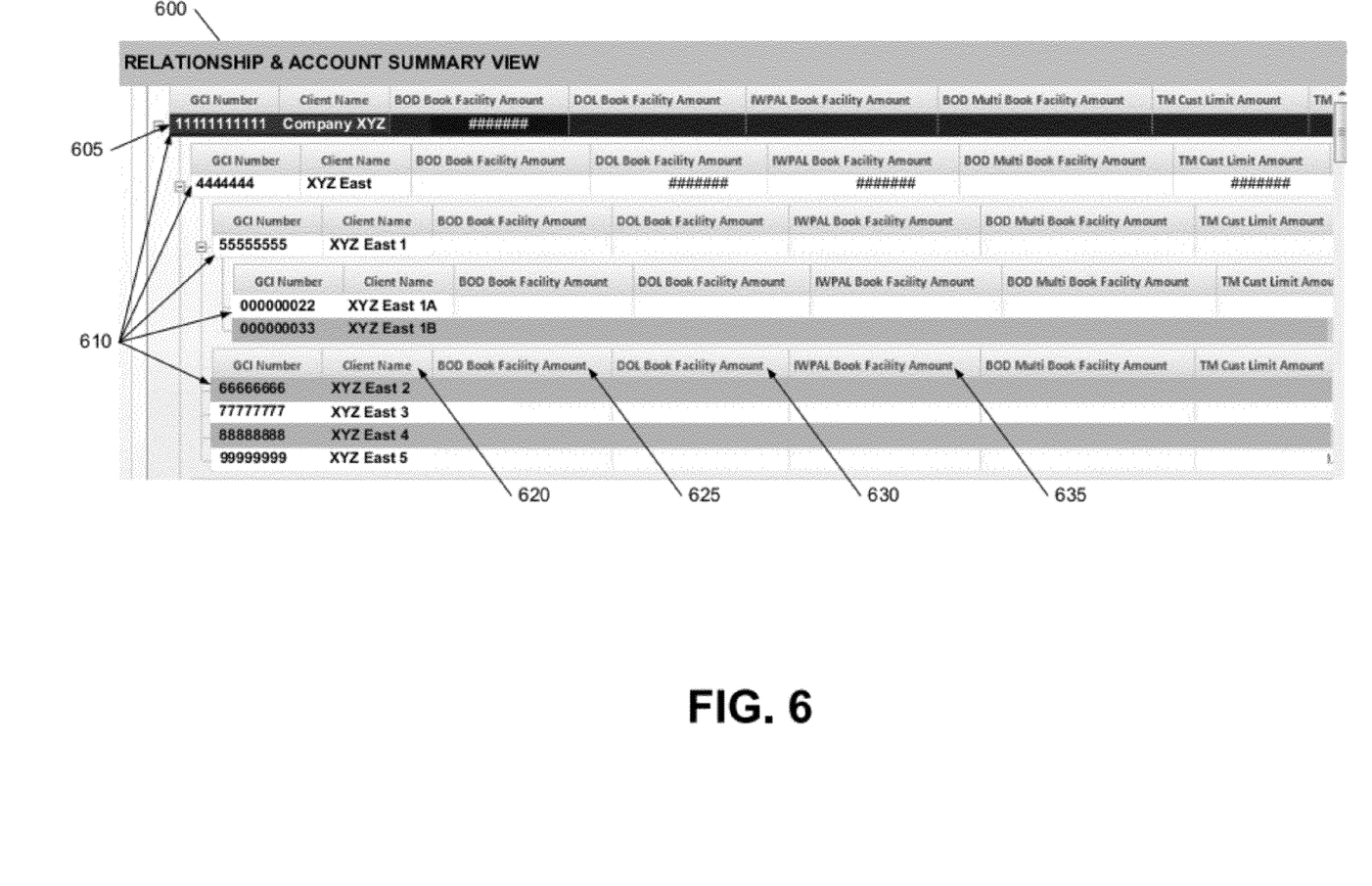
FIG. 6 illustrates an example user interface for viewing summary information about related accounts having access to booked treasury limits according to one or more aspects described herein.

FIG. 6 is an example GUI for viewing various details about treasury limits associated with different levels of a global client relationship. As shown, a Relationship and Account Summary View GUI 600 may be presented to a user of GTMS to enable the user to gain a comprehensive view of how certain clients are interrelated. For example, a user may expand and collapse the various levels of the client relationship 610 illustrated in GUI 600 to identify a parent client, such as "Company XYZ," and one or more primary clients (e.g., subsidiaries of the parent company), such as "XYZ East." Some client relationships, including the example client relationship shown in GUI 600, may include multiple levels of parent and/or primary clients. For example, "XYZ East" may be considered both a primary client with "Company XYZ" as its parent, as well as a parent of primary clients "XYZ East 1," "XYZ East 2," "XYZ East 3," and the like. In such a relationship, "Company XYZ" may be referred to as the ultimate parent client.

In at least some arrangements, a user of the Relationship and Account Summary View GUI 600 may view various account details for one or more of the clients associated with the client relationship displayed. For example, a user of GUI 600 may view the Global Client Identifier (GCI) Number 605, Client Name 620, Book Limit (BOD) Amount 625, Daylight Limit (DOL) Amount 630, International Wires Pre-Advised Limit (IWPAL) Amount, as well as numerous other attributes and data for each of the clients in a related family of clients of the organization.

As used herein, GCI is a client identification number that provides an organization with the ability to link together all of a client's various uses of the organization's products and services in order to establish consistent identification and aggregation of both clients and account officers (e.g., managers, representatives, approvers, supervisors, and the like) of the organization. Additionally, exceeding line of credit refers to a negative balance in a deposit account that can occur, for example, when deposited items are returned in amounts exceeding the account balance, items presented for payment on the account in amounts exceeding the account balance are honored, or one or more errors occur in transferring funds between a client's multiple accounts.

Figure 7:
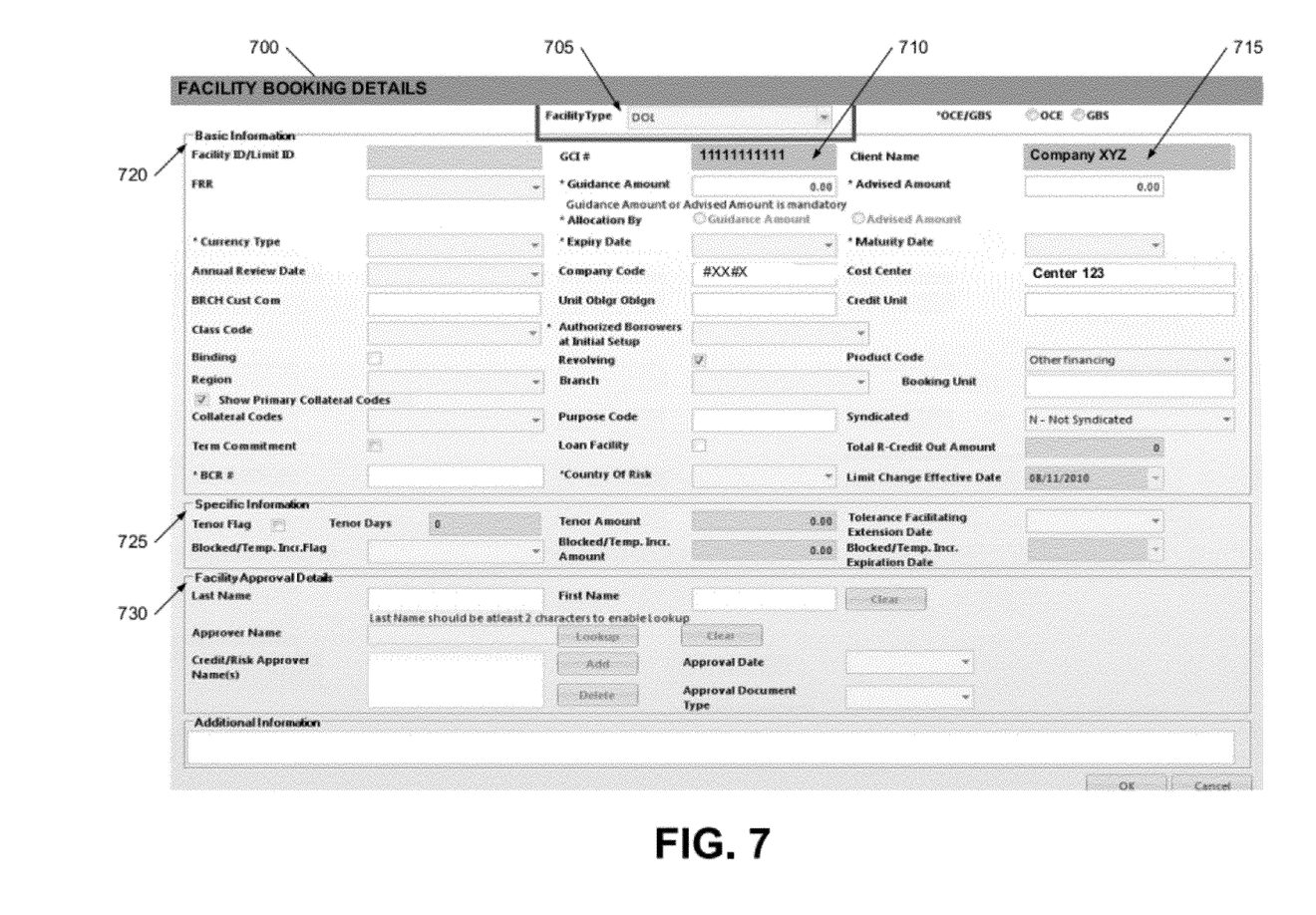
FIG. 7 illustrates an example user interface for entering details about various recorded limits for clients along with supporting information according to one or more aspects described herein.

FIG. 7 is an example GUI that provides authorized users of the global treasury monitoring system the ability to enter BOD, DOL and IWPAL facilities for clients, along with supporting information, to be stored in a global system of record both for reporting purposes and for use in payment exception processing (e.g., processing transactions exceeding a line of credit). As shown in FIG. 7, a Facility Booking Details GUI 700 may be used to submit various details related to limits for a particular client of the organization, identified by GCI Number 710 and/or Client Name 715 input. A user may select a limit type for which the user wishes to enter details from a "Facility Type" dropdown menu 705. In addition to selecting a facility type and entering a GCI number and/or client name, a user may also input other related information, such as information relevant to any of the identified fields and dropdown menus shown in the "Basic Information" section 720 of GUI 700. In some arrangements, Facility Booking Details GUI 700 may also include a "Specific Information" section 725 and a Facility Approval Details section 730 to allow users to enter and submit further information about one or more limits for a particular client.

Figure 8:
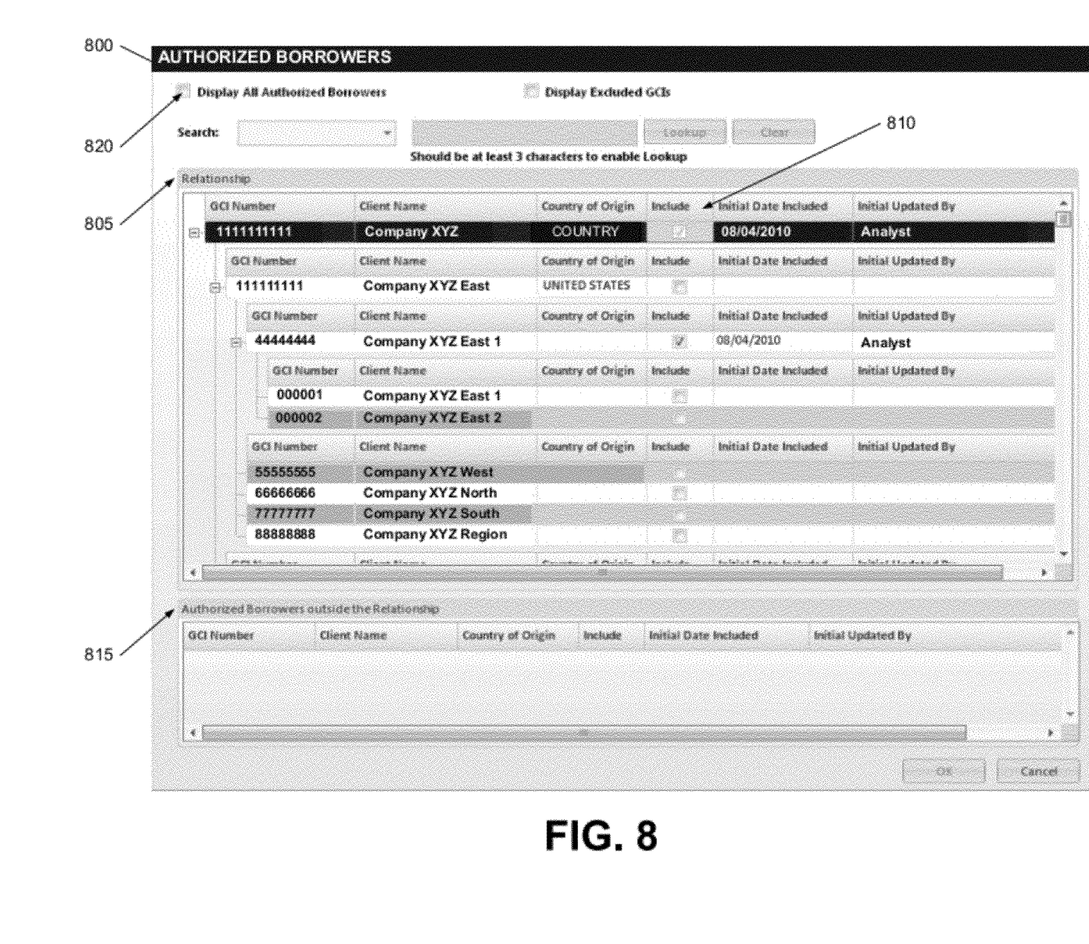
FIG. 8 illustrates an example user interface for viewing and updating authorized borrowers of a shared limit in a client relationship according to one or more aspects described herein.

FIG. 8 is an example GUI that allows a user to view and/or select related clients of the organization (e.g., a parent client and one or more primary clients that may be subsidiaries of the parent client) permitted to share in a particular limit. As shown in the "Authorized Borrowers" GUI 800 of FIG. 8, a user may select to display all authorized borrowers 820 in a given family of related clients, which may be presented in a "Relationship" section 805 of GUI 800. A user may collapse/expand the various levels of the client relationship to view those clients of a related group or family allowed to utilize the same limit established by the organization in one of the various manners described above. Additionally, as indicated by the "Include" checkbox 810 of GUI 800, users may select one or more related clients to share in a given limit of the client relationship, as well as deselect any clients from continuing to be able to share in such a limit. In at least one arrangement, GUI 800 may also provide a user with the ability to authorize borrowers outside of a client relationship to utilize a limit established for the relationship, as indicated by section 815 of GUI 800.

Figure 9:
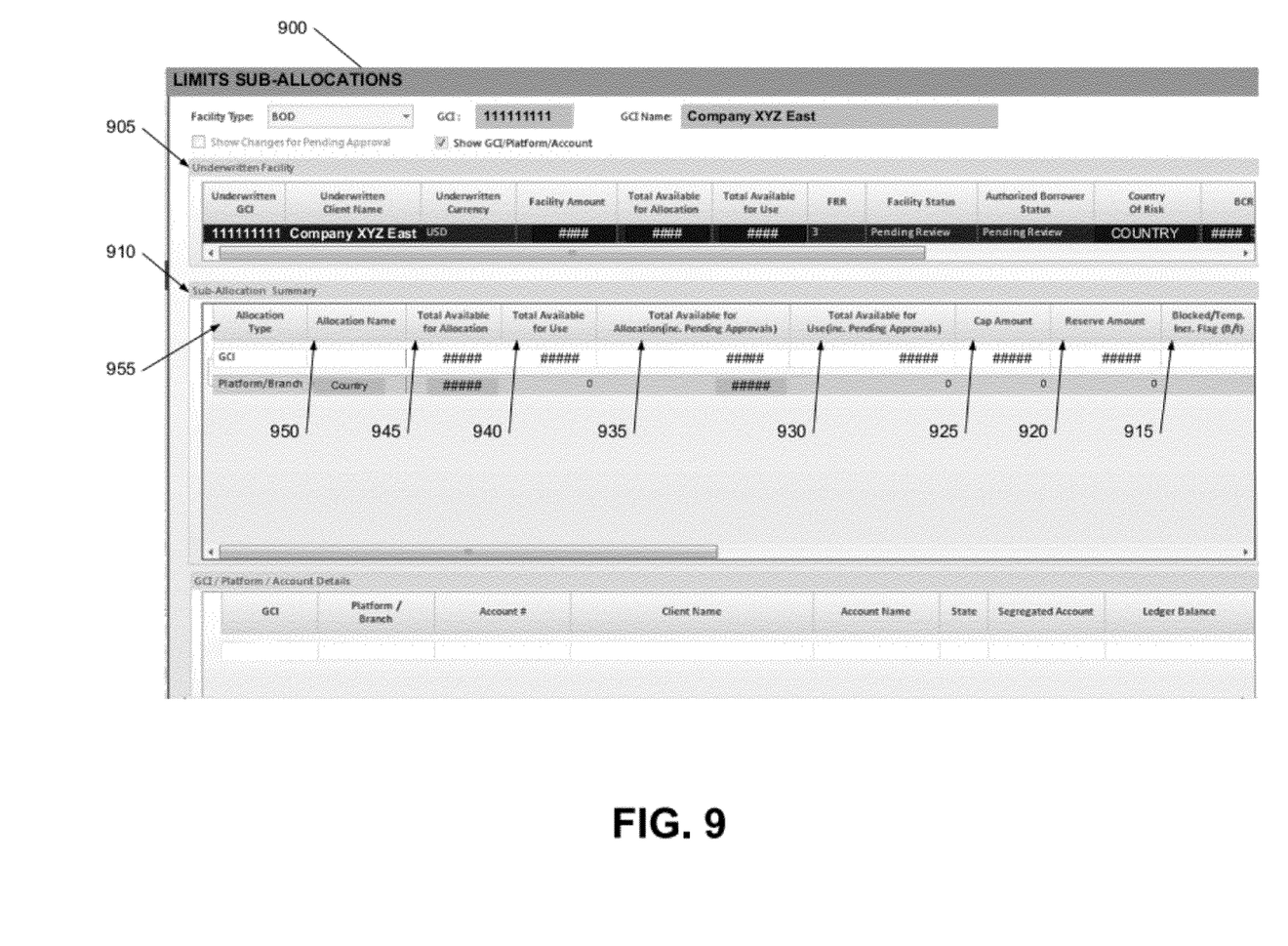
FIG. 9 illustrates an example user interface for viewing information about sub-allocations of recorded limits in a client relationship according to one or more aspects described herein.
Figure 10:
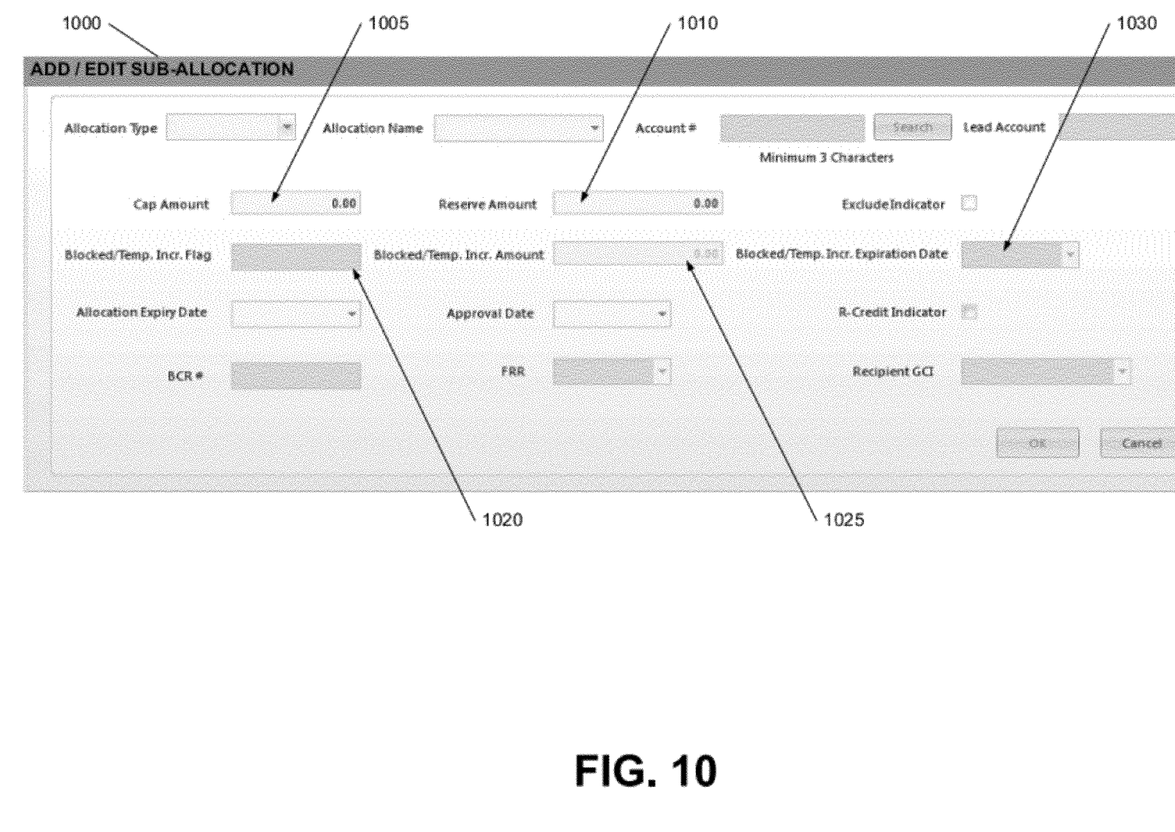
FIG. 10 illustrates an example user interface for adding and editing recorded information about sub-allocations of limits according to one or more aspects described herein.

FIGS. 9 and 10 are example GUIs that allow users of GTMS (e.g., GTMS 300 shown in FIG. 3) to view and update (e.g., add/edit) sub-allocations of limits recorded for certain client relationships. The Limits Sub-Allocations GUI 900 shown in FIG. 9 enables users to view how limits are allocated for use across borrowers, regions, deposit platforms, branches and accounts of the organization, as shown by section 905 of GUI 900. Additionally, users may view summary information presented in sub-allocation summary section 910 of GUI 900, including information about allocation type 955, allocation name 950, total amount of a limit available for allocation 945 across the client relationship, and total amount of a limit available for use, which differs from the total amount available for allocation in that not all of a limit that is allocated to a client relationship is available for use by an authorized borrower of that relationship. Additionally, sub-allocation summary section 910 of GUI 900 may also present information related to total amount of limit available for allocation and use pending certain approvals of adjusted limits (fields 935 and 930 shown in FIG. 9), as well as any cap amounts 925 on the limit, reserved allocations 920, and certain blocked or excluded entities or clients in the relationship 915.

An example Add/Edit Sub-Allocation GUI 1000 is shown in FIG. 10, which in one or more arrangements allows authorized users (e.g., limits analysts of the organization) to enter allocations that enable clients and/or credit teams to most effectively leverage their respective limits. As shown in GUI 1000, a user may enter data into numerous different fields including, for example, cap amount 1005 and reserve amount 1010, as well as enter information about any blocked or temporary increase status flags 1020, blocked or temporarily increased allocation amounts 1025 and also any blocked or temporarily increased allocation expiration dates 1030.

Although specific examples of carrying out the aspects of the disclosure have been described, those skilled in the art will appreciate that there are numerous variations and permutations of the above-described systems and methods that are contained within the spirit and scope of the disclosure as set forth in the appended claims. Additionally, numerous other embodiments, modifications and variations within the scope and spirit of the appended claims will occur to persons of ordinary skill in the art from a review of this disclosure.

We claim:

1. A method comprising:
   receiving, at a server, a request to store a treasury limit associated with an authorized client account of an organization;
   retrieving, by the server, approval data for the treasury limit associated with the authorized client account of the organization from an approval database of the organization;
   storing, by the server, the treasury limit associated with the authorized client account of the organization based on the retrieved approval data and on client data associated with the account;
   identifying, by the server, one or more clients of the organization authorized to share the stored treasury limit, wherein the one or more clients are identified based on the approval and client data associated with the authorized client account, and wherein the one or more clients include a parent corporation and one or more subsidiaries of the parent corporation; and
   receiving, at the server, allocation data input from a member of the organization, wherein the allocation data indicates how the stored treasury limit is allocated between the one or more clients authorized to share the treasury limit, and wherein the allocation data indicates an allocation of the stored treasury limit between the one or more subsidiaries of the parent corporation.

2. The method of claim 1, further comprising:
   determining, by the server, the treasury limit is approved for use with transactions on the authorized client account based on the retrieved approval data; and
   reporting, by the server, the stored treasury limit and the identified one or more clients to one or more account transaction systems of the organization.

3. The method of claim 2, further comprising:
   adjusting, by the server, a previously stored treasury limit for the authorized client account based on the retrieved approval data; and
   reporting, by the server, the adjusted treasury limit to the one or more account transaction systems of the organization.

4. The method of claim 1, wherein the server identifies the one or more clients of the organization authorized to share the stored treasury limit based on data input received through a user interface presented to a member of the organization.

5. The method of claim 4, wherein the server receives the allocations data input through the user interface, further comprising:
   updating, by the server, stored allocations data for the authorized client account based on the received allocations data; and
   reporting, by the server, the updated allocations data to one or more account transaction systems of the organization for use in allocating the treasury limit between the one or more clients.

6. The method of claim 1, further comprising:
   receiving, at the server, requests for the stored treasury limit from one or more account transaction systems of the organization;
   determining, by the server, the requests for the stored treasury limit are associated with the one or more clients of the organization authorized to share the stored treasury limit;
   responsive to determining that the requests are associated with the one or more clients, the server transmitting the stored treasury limit to the one or more account transaction systems; and
   responsive to transmitting the stored treasury limit to the one or more account transaction systems, the server updating the client data and the allocation data associated with the authorized client account.

7. The method of claim 6, further comprising:
   determining, by the server, a request for the stored treasury limit includes a request to use the stored treasury limit for a transaction exceeding an amount of the stored treasury limit; and
   transmitting, by the server, a notification identifying the request and the transaction to a monitoring system of the organization.

8. An apparatus comprising:
   a processor; and
   a memory storing computer-readable instructions that, when executed by the processor, cause the processor to:
      receive a request to store a treasury limit associated with an authorized client account of an organization;
      retrieve approval data for the treasury limit associated with the authorized client account of the organization from an approval database of the organization;
      store the treasury limit associated with the authorized client account of the organization based on the retrieved approval data and on client data associated with the account;
      identify one or more clients of the organization authorized to share the stored treasury limit, wherein the one or more clients are identified based on the approval and client data associated with the account, and wherein the one or more clients include a parent corporation and one or more subsidiaries of the parent corporation; and
      receive allocation data input from a member of the organization, wherein the allocation data indicates how the stored treasury limit is allocated between the one or more clients authorized to share the treasury limit, and wherein the allocation data indicates an allocation of the stored treasury limit between the one or more subsidiaries of the parent corporation.

9. The apparatus of claim 8, the memory storing computer-readable instructions that, when executed by the processor, further cause the processor to:
   determine the treasury limit is approved for use with transactions on the authorized client account based on the retrieved approval data; and
   report the stored treasury limit and the identified one or more clients to one or more account transaction systems of the organization.

10. The apparatus of claim 9, the memory storing computer-readable instructions that, when executed by the processor, further cause the processor to:
   adjust a previously stored treasury limit for the authorized client account based on the retrieved approval data; and
   report the adjusted treasury limit to the one or more account transaction systems of the organization.

11. The apparatus of claim 8, further comprising a user interface configured to receive data from a user, the memory storing computer-readable instructions that, when executed by the processor, further cause the processor to:
- receive data input through the user interface from a member of the organization; and
- display the user the one or more clients of the organization authorized to share the stored treasury limit based on the received data input.

12. The apparatus of claim 11, the memory storing computer-readable instructions that, when executed by the processor, further cause the processor to:
- update stored allocations data for the authorized client account based on the received allocations data; and
- report the updated allocations data to one or more account transaction systems of the organization for use in allocating the treasury limit between the one or more clients.

13. The apparatus of claim 8, the memory storing computer-readable instructions that, when executed by the processor, further cause the processor to:
- receive requests for the stored treasury limit from one or more account transaction systems of the organization;
- determine the requests for the stored treasury limit are associated with the one or more authorized clients of the organization authorized to share the stored treasury limit;
- responsive to determining that the requests are associated with the one or more authorized clients, transmit the stored treasury limit to the one or more account transaction systems; and
- responsive to transmitting the stored treasury limit to the one or more account transaction systems, update the authorized client data and the allocation data associated with the authorized client account.

14. The apparatus of claim 13, the memory storing computer-readable instructions that, when executed by the processor, further cause the processor to:
- determine a request for the stored treasury limit includes a request to use the stored treasury limit for a transaction exceeding an amount of the stored treasury limit; and
- transmit a notification identifying the request and the transaction to a monitoring system of the organization.

15. One or more computer-readable storage media storing computer-executable instructions that, when executed by one or more computers, cause the one or more computers to perform a method comprising:
- receiving a request to store a treasury limit associated with an authorized client account of an organization;
- retrieving approval data for the treasury limit associated with the authorized client account of the organization from an approval database of the organization;
- storing the treasury limit associated with the authorized client account of the organization based on the retrieved approval data and on client data associated with the account;
- identifying one or more clients of the organization authorized to share the stored treasury limit, wherein the one or more clients are identified based on the approval and client data associated with the authorized client account, and wherein the one or more authorized clients include a parent corporation and one or more subsidiaries of the parent corporation; and
- receiving allocation data input from a member of the organization, wherein the allocation data indicates how the stored treasury limit is allocated between the one or more clients authorized to share the treasury limit, and wherein the allocation data indicates an allocation of the stored treasury limit between the one or more subsidiaries of the parent corporation.

16. The one or more computer-readable storage media of claim 15, the computer-readable instructions that, when executed by at least one computer, further cause the at least one computer to perform:
- determining the treasury limit is approved for use with transactions on the authorized client account based on the retrieved approval data; and
- reporting the stored treasury limit and the identified one or more authorized clients to one or more account transaction systems of the organization.

17. The one or more computer-readable storage media of claim 16, the computer-readable instructions that, when executed by at least one computer, further cause the at least one computer to perform:
- adjusting a previously stored treasury limit for the authorized client account based on the retrieved approval data; and
- reporting the adjusted treasury limit to the one or more authorized client account transaction systems of the organization.

18. The one or more computer-readable storage media of claim 15, the computer-readable instructions that, when executed by at least one computer, further cause the at least one computer to perform:
- receiving data input through a user interface from a member of the organization; and
- displaying to the user the one or more clients of the organization authorized to share the stored treasury limit based on the received data input.

19. The one or more computer-readable storage media of claim 18, the computer-readable instructions that, when executed by at least one computer, further cause the at least one computer to perform:
- updating stored allocations data for the authorized client account based on the received allocations data; and
- reporting the updated allocations data to one or more account transaction systems of the organization for use in allocating the treasury limit between the one or more authorized clients.

20. The one or more computer-readable storage media of claim 15, the computer-readable instructions that, when executed by at least one computer, further cause the at least one computer to perform:
- receiving requests for the stored treasury limit from one or more authorized client account transaction systems of the organization;
- determining the requests for the stored treasury limit are associated with the one or more clients of the organization authorized to share the stored treasury limit;
- responsive to determining that the requests are associated with the one or more authorized clients, transmitting the stored treasury limit to the one or more account transaction systems; and
- responsive to transmitting the stored treasury limit to the one or more account transaction systems, updating the authorized client data and the allocation data associated with the authorized client account.

21. The one or more computer-readable storage media of claim 20, the computer-readable instructions that, when executed by at least one computer, further cause the at least one computer to perform:
- determining a request for the stored treasury limit includes a request to use the stored treasury limit for a transaction exceeding an amount of the stored treasury limit; and
- transmitting a notification identifying the request and the transaction to a monitoring system of the organization.

* * * * *